United States Patent
Butterfield et al.

(10) Patent No.: US 6,550,727 B2
(45) Date of Patent: Apr. 22, 2003

(54) DISENGAGEABLE QUICK-LOCK CONNECTION FOR TELESCOPIC SHAFT

(75) Inventors: Gordon C. Butterfield, Torrington, CT (US); Allan D. Cox, Thomaston, CT (US); Giovanni C. Albini, Watertown, CT (US)

(73) Assignee: The Torrington Company, Torrington, CT (US)

(*) Notice: Subject to any disclaimer, the term of this patent is extended or adjusted under 35 U.S.C. 154(b) by 0 days.

(21) Appl. No.: 09/989,096

(22) Filed: Nov. 20, 2001

(65) Prior Publication Data

US 2002/0074466 A1 Jun. 20, 2002

Related U.S. Application Data

(63) Continuation of application No. 09/811,677, filed on Mar. 19, 2001, now abandoned, and a continuation of application No. 09/397,558, filed on Sep. 16, 1999, now abandoned.

(51) Int. Cl.[7] .............................................. F16M 11/26
(52) U.S. Cl. ............................. 248/188.5; 248/200.1; 403/349
(58) Field of Search .................... 248/200.1, 188.5; 403/109.1, 397, 350, 349

(56) References Cited

U.S. PATENT DOCUMENTS

| | | | |
|---|---|---|---|
| 1,629,058 A | * 5/1927 | Wilson | |
| 1,844,382 A | 2/1932 | Dardelet | |
| 2,164,732 A | 7/1939 | De Vries | 292/275 |
| 2,976,702 A | 3/1961 | Pietsch | 64/1 |
| 3,515,418 A | 6/1970 | Nielsen, Jr. | 287/58 |
| 3,719,381 A | 3/1973 | Venter | 292/275 |
| 4,043,146 A | 8/1977 | Stegherr et al. | 64/1 V |
| 4,653,142 A | * 3/1987 | Upton | |
| 4,770,560 A | 9/1988 | Ott | 403/296 |
| 4,848,956 A | * 7/1989 | Pettman | |
| 5,011,319 A | 4/1991 | Levi et al. | 403/109 |
| 5,235,734 A | 8/1993 | DuRocher et al. | 29/455.1 |
| 5,366,316 A | 11/1994 | Cymbal | 403/378 |
| 5,460,458 A | 10/1995 | Caceres | 403/109 |
| 5,595,800 A | * 1/1997 | Menzel | |
| 5,622,446 A | 4/1997 | Hibberd | 403/377 |
| 5,830,071 A | 11/1998 | Castellon | 464/162 |

FOREIGN PATENT DOCUMENTS

GB      1460864      * 1/1977

OTHER PUBLICATIONS

Derwent–Week 198210, Abdrakhman, May 1981.*

* cited by examiner

Primary Examiner—Alvin Chin-Shue
(74) Attorney, Agent, or Firm—Michael Best & Friedrich LLP

(57) ABSTRACT

A telescopic shaft for rapid length adjustment consists of a tube having a plurality of alternating circumferential ridges and grooves on at least a portion of an inner surface and having an oval cross-section with a major diameter $D_A$ and a minor diameter $D_B$; a shaft disposed within the tube and having matching circumferential ridges and grooves, the shaft also having an oval cross-section with a major diameter $D_C$ and a minor diameter $D_D$; and the ridges and grooves of the tube interengaging with the grooves and ridges of the shaft when the shaft major diameter $D_C$ is substantially parallel with the tube minor diameter $D_B$.

9 Claims, 2 Drawing Sheets

DISENGAGEABLE QUICK-LOCK CONNECTION FOR TELESCOPIC SHAFT

This application is a continuation of Ser. No. 09/811,677, filed May 19, 2001, abandoned, and configured of Ser. No. 09/397,558, filed Sep. 16, 1999, abandoned.

BACKGROUND OF THE INVENTION

This invention relates generally to length-adjustable shafts and more particularly to quick-change positive locking telescoping shafts.

There are innumerable applications in many diverse fields for length-adjustable shafts with positive locking features. One such application is in telescoping adjustable steering columns of motor vehicles, in which it is desirable to be able to quickly change the length of the steering column and to in positively lock it in the selected position.

Many length-adjustable shafts have quick-change capability based on frictional locking mechanisms, similar to collets, in which a tapered ring is threaded on a split tube member to frictionally lock a mating tube or shaft in position within the split tube. These are quite effective, but they provide clamping force which is limited by the operator's skill in tightening the threaded ring and also by wear and contamination of the clamping surfaces. Also, they do not provide positive locking since the clamping force can be overcome by a large axial load on the shaft.

Many other current shafts have rack and pawl adjustment locks in which a pawl is pivoted away from a rack on the sliding member of the shaft to allow change of length. When released, the pawl pivots back into engagement with the rack by spring action to lock the shaft in position.

Currently, still other such shafts are made by threading the inside of a tube and the outside of a mating shaft and then axially cutting away slightly more than half the threads on both members by machining flats on opposing sides of the shaft and arced grooves on opposing sides of the inside of the tube. The shaft can then be inserted in the tube with its remaining threads aligned with the arced grooves of the tube so it slides into the desired position. The shaft is given a quarter turn to lock it in any position relative to the tube. To readjust the length of the shaft/tube couple, it is only necessary to turn either member one-quarter turn and slide it to the new position and re-lock it. These provide quick adjustment and are capable of positive locking, but the presence of burrs at the edges of the machined flats and grooves often prevents turning the tube and shaft to the locked position. Even without burrs, the flats at the edges of the threads on the shaft and tube may butt against each other and prevent turning to the locked position; because they have no normal lead in as would be found in common threads.

The foregoing illustrates limitations known to exist in present quick-change adjustable length shafts. Thus, it would clearly be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a telescopic shaft for rapid length adjustment, comprising a tube having a plurality of substantially circumferential alternating ridges and grooves on at least a portion of an inner surface and having an oval cross-section with a major diameter $D_A$ and a minor diameter $D_B$; an inner shaft member disposed within said tube and having matching ridges and grooves, the shaft also having an oval cross-section with a major diameter $D_C$ and a minor diameter $D_D$; and the ridges and grooves of said tube interengaging with the grooves and ridges of said shaft when the shaft major diameter $D_C$ is substantially parallel with the tube minor diameter $D_B$.

The foregoing and other aspects will become apparent from the following detailed description of the invention when considered in conjunction with the accompanying drawings.

DETAILED DESCRIPTION

Figure 1A:
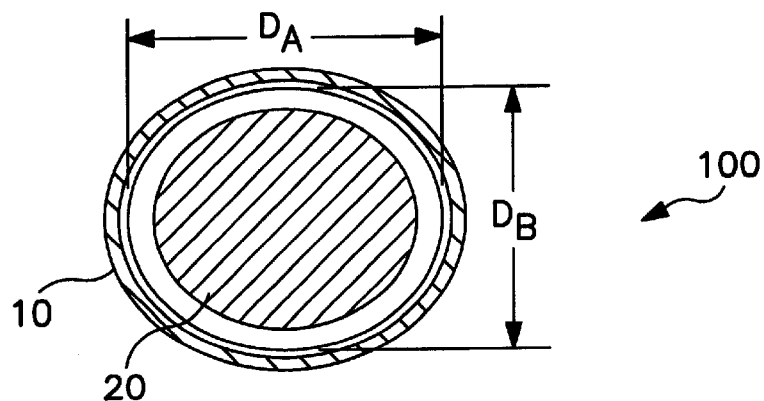
FIGS. 1a, 1b, and 1c are three transverse sectional views of a telescopic shaft of the invention.
Figure 1B:
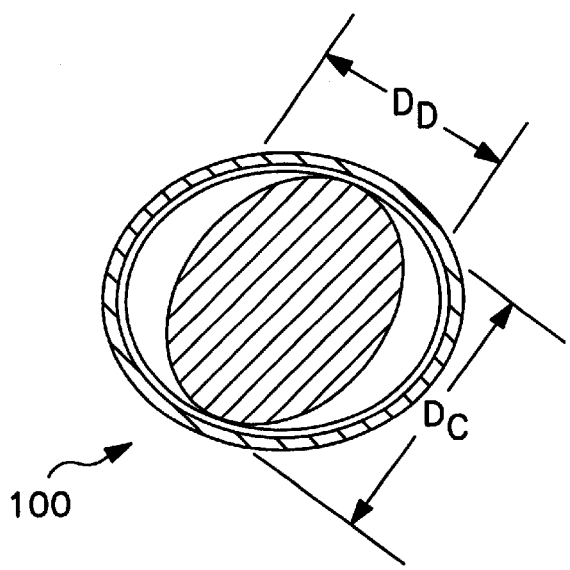
Figure 1C:
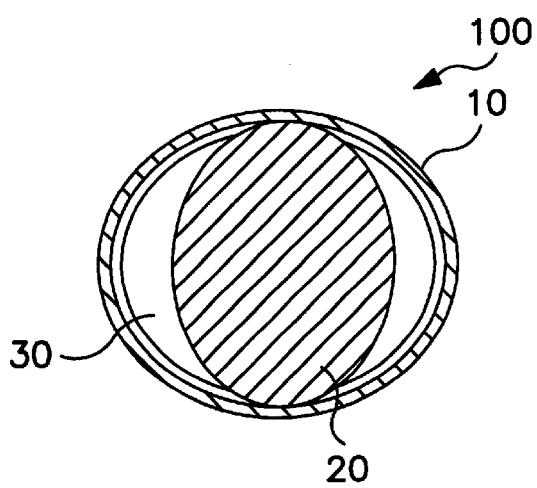

FIGS. 1a, 1b, and 1c show transverse sectional views of the telescopic shaft 100 of the invention. For best understanding of the features of the invention, it is best to consider FIGS. 1, 2, and 3, as appropriate, in order to see longitudinal and perspective views when necessary. In its simplest form, the telescopic shaft 100 consists of an outer tube member 10 and an axially slidable inner shaft member 20, each of which have oval cross-sections and alternating circumferential grooves and ridges (See FIG. 2) or, alternatively, continuous threads on their contacting surfaces. The outer tube member 10 has a major diameter $D_A$ and a minor diameter $D_B$. The inner shaft member 20, disposed within the outer tube 10, has matching ridges and grooves and also has an oval cross-section with a major diameter $D_C$ and a minor diameter $D_D$.

FIG. 1a shows the major diameters $D_A$ of the outer tube member 10 and $D_C$ of the inner shaft member 20 in parallel relationship. In this position the inner shaft member 20 can slide axially within the outer tube member 10. FIG. 1b shows the major diameter $D_C$ of the inner shaft 20 rotated to a position, approaching the minor diameter $D_B$ of the outer tube 10, in which its grooves 27 and ridges 25 begin to interengage with the ridges 15 and grooves 17 of the tube 10.

FIG. 1c shows the outer tube and inner shaft in the fully locked position in which the major diameters are at right angles to each other. Here the ridges 15 of the tube are maximally engaged with the grooves 27 of the shaft, and the ridges 25 of the shaft are maximally engaged with the grooves 15 of the tube. Of course, even though there is a large difference in the diameters of the tube and shaft, the alternating ridges 15 and grooves 17 of the outer tube 10 may tend to engage the alternating grooves 27 and ridges 25 of the inner shaft 20, merely due to the difficulty of keeping a long shaft centered in a long tube, and make it difficult to slide one relative to the other. To prevent any unwanted engagement, a centering plug 30 may be pivotally mounted on the end of the shaft 20 on a pin or journal 35. This plug 30 has a slip fit in the outer tube 10 so that it is easily moved, but it just clears the ridges of the tube. The plug 30 keeps the inner shaft 20 properly centered in the outer tube 10, so there is no unwanted engagement between the ridges and grooves of the members when the shaft is being telescopically adjusted. Of course, when the ridges and grooves of the inner and outer members are prevented from engagement by other means, the centering plug is not needed.

Figure 2:
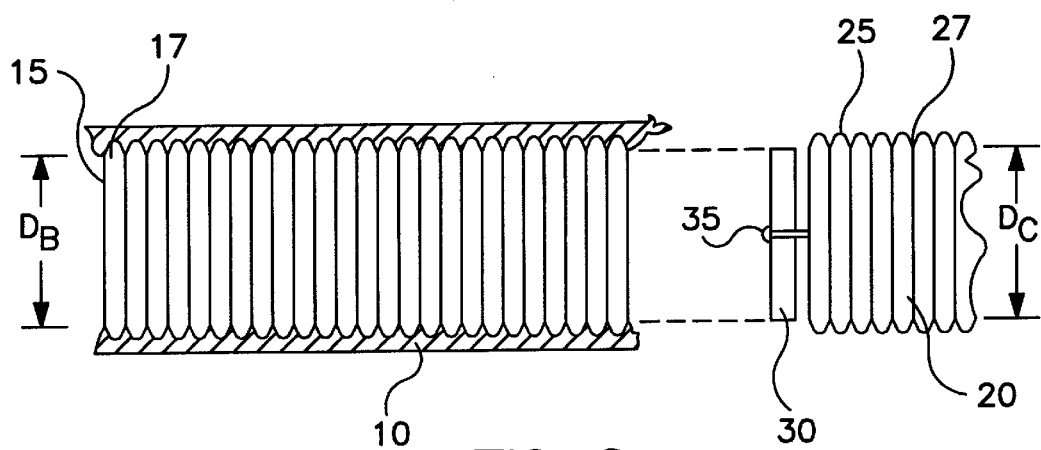
FIG. 2 is a fragmentary longitudinal partly sectional exploded view of the telescopic shaft.

FIG. 2 shows a fragmentary partially sectional longitudinal exploded view of the telescopic shaft of the invention as shown in FIG. 1c. In this view, the ridges 15 and grooves 17 of the tube 10 and the mating grooves 27 and ridges 25 of the shaft 20 are seen in their locked configuration with their major diameters crossed at right angles to each other. ($D_B$ is parallel to $D_C$). The centering plug 30 is rotatably attached to the end of the shaft 20 by a spindle or other fastener 35, so that, when the major diameters of the shaft and tube are parallel, as in FIG. 1a, the plug 30 keeps the grooves and ridges of the shaft 20 separated from the ridges and grooves of the tube 10. This centering action allows smooth and easy length adjustment. The shaft may be made from a heavy-walled tube (not shown) to save weight. In that case, the plug fastener would need to provide adaptation for fastening the centering plug to the shaft by any of several well known options.

Figure 3A:
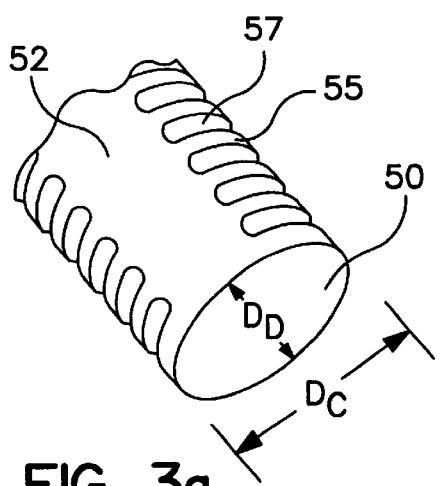
FIGS. 3a and 3b are fragmentary perspective views of an alternative embodiment of the inner shaft member and a longitudinal section of the matching outer tube member, respectively.
Figure 3B:
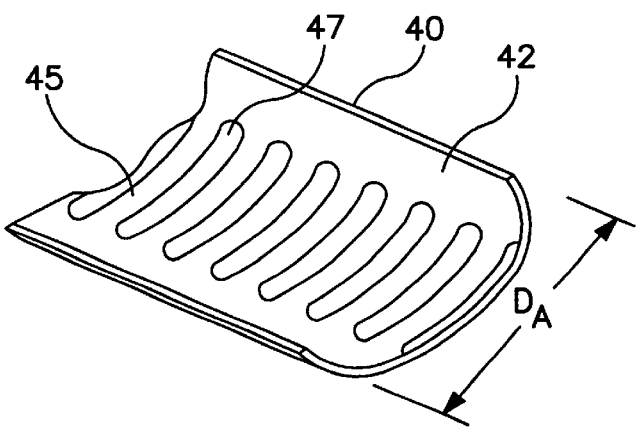

FIGS. 3a and 3b show an alternative embodiment of the inner shaft member 50 and the outer tube member 40. In this embodiment, the ridges 55, 45 and grooves 57, 47 are provided only on the portions of the outer tube 40 and inner shaft 50 which actually interengage when locked. The ends 42 of the outer member 40 in line with the major diameter and the sides 52 of the inner member 50 in line with its minor diameter need not have any ridges and grooves. Thus, the ridges and grooves only appear on the surfaces of the shaft and tube in line with the major diameter of the shaft and the minor diameter of the tube. It is clear from these Figures that the inner shaft 50 need not be oval, as shown in FIG. 3A. The sides 52 can be flat so that the shaft has a double D profile as long as it has ridges 55 and grooves 57 at its ends to interengage with grooves 47 and ridges 45 on the sides of the outer tube 40. The shapes of the inner and outer members can be any which have congruent arcuate cross-sections on which the ridges and Grooves are disposed.

The methods for making the invention include fully threading the ID of a tube and the OD of a shaft and deforming them both until the major diameter of the shaft is approximately equal to the minor diameter of the tube. The ridges and grooves can be made as separate parallel circumferential forms or a continuous thread. The threads, or alternating grooves and ridges, may be formed by cutting or machining processes, or they may also be formed by rolling or other non-cutting techniques. This would be determined by the equipment available.

Another method for making the telescopic shaft requires procuring a tube with an oval cross-section and a shaft, which may be hollow, also with an oval cross-section. A circular threading tool, cutting tool, or rolling tool is used to form alternating grooves and ridges on the shaft and tube in line with the major diameter of the former and the minor diameter of the latter. This would have the advantage of minimizing the amount of starting material needed. It would also minimize waste by minimizing the amount of cutting necessary to provide the ridges and grooves on the shaft and tube, in cases where the cutting method is chosen for forming the ridges and grooves.

In order to prevent turning the shaft or tube through a greater arc than necessary for locking the telescopic shaft length, it would be possible to make the major diameter $D_C$ of the shaft 20 slightly greater than the minor diameter $D_B$ of the tube 10. This would prevent turning the shaft past the locked position back to an unlocked position, but it could cause jamming of the engaging ridges and grooves if turned too tightly. Another solution is to include an axial key or other discontinuity in the alternating ridges and grooves. The discontinuity can be provided by any axial interruption in the alternating ridges and grooves such as a weld bead or a rolled groove to disrupt the smooth groove/ridge profile. This discontinuity can be provided on either one or both of the members. Since it does not require any additional manufacturing steps, the first option, that of providing a shaft major diameter greater than the tube minor diameter, is preferred.

Having described the invention, we claim:

1. A method for making a quick-change length-adjustable telescopic shaft, the method comprising the following steps:
    providing a tube member with a round cross section and circumferentially oriented grooves and ridges on an inside surface of the round tube member;
    deforming the grooved and ridged round tube member to form an oval tube member with a major inner diameter and a minor inner diameter; and
    inserting a non-round inner shaft axially into the flattened oval tube member, the inner shaft having a minor outer diameter less than the minor inner diameter of the oval tube member to allow axial insertion and having a major outer diameter greater than the minor inner diameter of the oval tube member such that rotation of the non-round inner shaft results in mating engagement with the circumferentially oriented grooves and ridges of the oval tube member.

2. The method according to claim 1, wherein the inner shaft is formed with circumferentially oriented grooves and ridges for mating engagement with the oval tube member.

3. The method according to claim 2, comprising the further step of providing at least one discontinuity in the circumferentially oriented ridges and grooves of at least one of the oval tube member and the inner shaft to act as a rotation stop when the inner shaft is rotated to the locked position within the oval tube member.

4. The method according to claim 1, wherein the circumferentially oriented grooves and ridges on the round tube member are continuous threads.

5. The method according to claim 1, wherein the inner shaft comprises a hollow tube.

6. A quick-change length-adjustable telescopic shaft comprising:
    an oval tube member having circumferentially oriented grooves and ridges on an inner surface and an oval cross section with a major inner diameter and a minor inner diameter; and
    a non-round inner shaft disposed within the oval tube member, the inner shaft having a minor outer diameter less than the minor inner diameter of the oval tube member, allowing relative axial movement of the inner shaft and oval tube member, and having a major outer diameter greater than the minor inner diameter of the oval tube member such that the inner shaft can be rotated into mating engagement with the grooves and ridges of the oval tube member, further comprising a centering plug rotatably connected to the end of the inner shaft for radially centering the inner shaft within the oval tube member.

7. The telescopic shaft according to claim 6, wherein the inner shaft has circumferentially oriented grooves and ridges for mating engagement with the oval tube member.

8. The telescopic shaft according to claim 7, wherein at least one of the oval tube member and the inner shaft has at least one discontinuity in the circumferentially oriented ridges and grooves to provide a rotation stop when the inner shaft is rotated to the locked position within the oval tube member.

9. The telescopic shaft according to claim 6, wherein the inner shaft comprises a hollow tube.

* * * * *

UNITED STATES PATENT AND TRADEMARK OFFICE
CERTIFICATE OF CORRECTION

PATENT NO.    : 6,550,727 B2
DATED         : April 22, 2003
INVENTOR(S)   : Gordon C. Butterfield, Allan D. Cox and Giovanni C. Albini It is certified that error appears in the above-identified patent and that said Letters Patent is hereby corrected as shown below:

<u>Title page,</u>
Item [63], delete "09/397,558" and insert -- 09/397,758 --.

<u>Column 1,</u>
Line 6, delete "09/397,558" and insert -- 09/397,758 --.
Line 18, first occurrence, delete "in".

Signed and Sealed this

Nineteenth Day of August, 2003

JAMES E. ROGAN
*Director of the United States Patent and Trademark Office*